United States Patent [19]

Micka

[11] 3,909,602

[45] Sept. 30, 1975

[54] AUTOMATIC VISUAL INSPECTION SYSTEM FOR MICROELECTRONICS

[75] Inventor: Ernest Z. Micka, LaCanada, Calif.

[73] Assignee: California Institute of Technology, Pasadena, Calif.

[22] Filed: Sept. 27, 1973

[21] Appl. No.: 401,224

[52] U.S. Cl. ............ 235/151.3; 235/156; 250/563; 250/572; 356/165; 356/237

[51] Int. Cl. ........................ G06f 15/46; G01n 21/32

[58] Field of Search ......... 235/151.3; 356/158, 159, 356/160, 163, 165, 168, 204, 212, 209, 222, 229, 237, 238; 340/146.3 Q, 146.3 G; 250/556, 557, 562, 563, 572

[56] References Cited

UNITED STATES PATENTS

| | | | |
|---|---|---|---|
| 3,659,950 | 5/1972 | Troll et al. | 356/238 |
| 3,688,267 | 8/1972 | Iijima | 340/146.3 Q |
| 3,715,165 | 2/1973 | Smith | 356/209 |

OTHER PUBLICATIONS

IBM Technical Disclosure Bulletin, Tynan: Integrated Circuit Mask Inspection Technique, Vol. 11, No. 12, May 1969, p. 1695–1696.

IBM Tech. Discl. Bull. Laming et al., Mask Defect Inspection by Holograms, Vol. 14, No. 1, June 1971, p. 28–29.

*Primary Examiner*—Felix D. Gruber
*Attorney, Agent, or Firm*—Lindenberg, Freilich, Wasserman, Rosen & Fernandez

[57] ABSTRACT

A system for automatically inspecting an integrated circuit, including a device for shining a scanning narrow light beam at an integrated circuit to be inspected and another light beam at an accepted integrated circuit, a pair of photo-detectors that receive light reflected from these integrated circuits, and a comparing system compares the outputs of the photo-detectors.

15 Claims, 4 Drawing Figures

AUTOMATIC VISUAL INSPECTION SYSTEM FOR MICROELECTRONICS

ORIGIN OF THE INVENTION

The invention described herein was made in the performance of work under a NASA contract and is subject to the provision of Section 305 of the National Aeronautics and Space Act of 1958, public Law 85-568 (72 Stat., 435; 42 USC 2457).

BACKGROUND OF THE INVENTION

This invention relates to apparatus and methods for inspecting microelectronic circuits and more particularly to improvements therein.

Microelectronic circuits such as integrated circuit chips often must be visually inspected for defects that can lead to early failure. Microscopic inspection of a single integrated circuit can require many hours, which results in high cost and in the possibility of error arising from operator fatigue. Automatic inspection of a chip would be preferrable. However, it can only be achieved by scanning a test chip with a small scanning spot while scanning a master chip which has been previously found to be free of defects with a similarly dimensioned spot, and by comparing the light reflected from the two chips. However, an extremely small scanning spot is required, such as one which is one-tenthousandth inch in diameter, and it is necessary that the scanning spots on the two chips vary almost identically in position and intensity. This normally requires that light from a single scanning source be utilized, which must be divided into separate beams for scanning the separate chips, and in which the reflected beams must be detected. Also, the detecting system must be capable of detecting extremely small variations between two chips.

SUMMARY OF THE INVENTION

In accordance with the present invention, a system for inspecting a microelectronic circuit is provided, which splits a single beam into two substantially identical beams. These beams are directed at a chip to be inspected and at a master chip. The two beams which are reflected are then detected on separate photo-detectors. The system thus far described includes a light source which shines a light beam onto a mirror arrangement which provides a scanning pattern. The scanning light beam is then applied to a polarizing beam-splitter that divides the incoming beam into two beams of mutually perpendicular directions of polarization. One of the polarization component beams emerging from the beamsplitter passes through a quarter wave retardation plate and focusing lens onto a test chip, while the other polarization component beam passes through a different quarter wave plate and lens onto a master chip which is free of defects. Light reflected from each of the chips passes back through the lens and quarter wave plate and back to the polarization beamsplitter which combines the beams into an emerging beam. The emerging beam passes through a second polarization beamsplitter which divides the two components, directing them onto different photo-detectors. The outputs of the two photo-detectors are delivered to a comparing system which generates an output indicating whether or not the test chip is acceptable.

A preferred comparing system, in accordance with this invention, is one wherein the reflectance data derived from the standard chip is compared with the reflectance data derived from the test chip in a unique circuit arrangement which generates a correlation coefficient for the difference between two vector fields, A and B, where the vector A is derived by scanning over a discrete portion of the test chip and the vector B is derived by scanning over a corresponding portion of the reference chip in unison. The correlation coefficient is the cosine of the angle between A and B. A cross-correlation between the difference between the two vector fields A and B and the vector field under test or the test chip is then derived. Then a cross-correlation is performed between the difference (A-B) with the test chip vector A, and also with the reference chip vector B. This results in further increasing the sensitivity to small differences between the two. The computation circuitry produces an output which represents the indicated difference. This is compared with a threshold to produce a signal indicating acceptance or non-acceptance.

The novel features of the invention are set forth with particularity in the appended claims. The invention will best be understood from the following description when read in conjunction with the accompanying drawings.

DESCRIPTION OF THE PREFERRED EMBODIMENT

Figure 1:
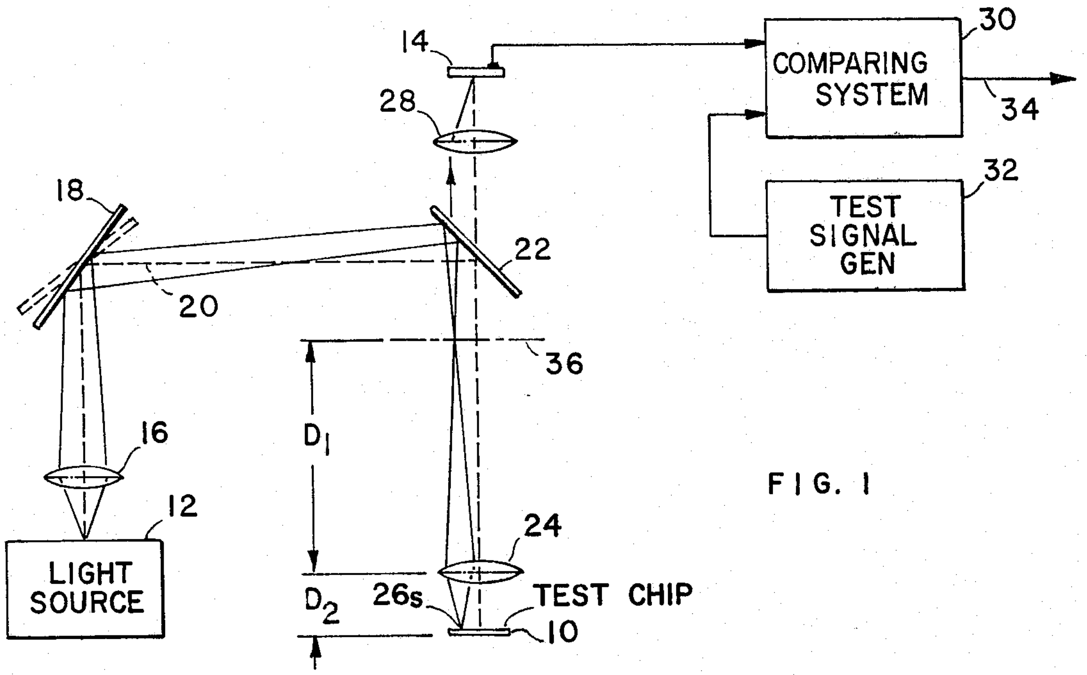
FIG. 1 is a simplified view of a visual inspection system constructed in accordance with my present invention.

FIG. 1 illustrates a system for inspecting a test chip 10 by shining light at it from a light source 12 and by detecting reflected light on a photo-detector 14. The light from the light source 12 passes through an initial lens 16 and past a scanning mirror 18 that directs the light in a scanning raster pattern within a wide range of angles with respect to the optical axis 20. Light from the scanner 18 is directed onto a partially transmitting and partially reflecting mirror 22 which reflects the light towards a focusing or objective lens 24 positioned in front of the test chip 10. The objective 24 forms the light into a small diameter scanning spot 26s lying at the surface of the test chip. Light reflected from the test chip is collected by the objective 24 and directed through the partially transmitting mirror 22 towards the photo-detector 14. A detector lens 28 positioned in front of the photo-detector concentrates the reflected light beam onto the detector. The detector 14, generates a current, in response to the light, which is delivered to a comparing system 30.

The comparing system 30 also receives signals from a test signal generator 32. The generator 32 produces signals similar to those which would be produced by an acceptable test chip. The comparing system 30 compares the signals resulting from light reflected from the test chip 10, with signals representing an acceptable chip produced by the generator 32, to produce an output at 34. The output 34 indicates the degree of correspondence of the signals derived from the test chip with those of the acceptable chip. The output at 34 can be a simple indication of whether the test chip is acceptable or not, or may indicate the types and magnitudes of errors in the test chip. The comparing system 30 is preferably a computer which is programmed to compare signals representing many spots of the chips, rather than a device that merely makes a point-by-point comparison. A point-by-point comparison is often not satisfactory because of misalignments that may occur or because some differences such as the degree of sharpness of detail edges or variability of data due to surface roughness, may be differences that should not be flagged as defects. However, a point-by-point comparison can be useful in some circumstances. A preferred arrangement for such a computer is described subsequently herein.

The initial lens 16 is positioned so that it focuses light from a point light source 12 onto an image plane 36 which lies in front of the objective 24. The objective 24 is positioned so that a scanning spot focused at the image plane 36 is focused onto the test chip 10. The distance $D_1$ between the image plane 36 and objective 24 is much larger than the distance $D_2$ between the objective and test chip 10, and may be, for example, 10 times as large. As a result, the size of the scanning spot 26*s* is one-tenth the size of the image formed at the image plane 36, and the dimensions of the scanning raster at the test chip is one-tenth the dimensions of the scanning raster at the image plane 36. This permits a scanning mirror system 18 to be utilized which is of moderately large size, to facilitate it's fabrication, and yet permits a very small scanning raster and very small scanning spot size to be utilized for the test chip. A typical integrated circuit chip may have a surface which is 0.2 inch by 0.2 inch and, it may require a scanning spot of 0.0001 inch to achieve the required degree of resolution. The optical system which reduces the scanning spot size and scanning raster size, facilitates the scanning of the chip. The system is also useful in permitting a focusing lens or objective 24 to be utilized between the test chip 10 and partially transmitting mirror 22. An objective lens is required between them in order to collect light reflected from the test chip 10 so that a large portion of the reflected light can be directed onto the photo-detector 14. The system permits the objective 24 to be present, by utilizing this lens in the generation of the scanning raster.

Figure 2:
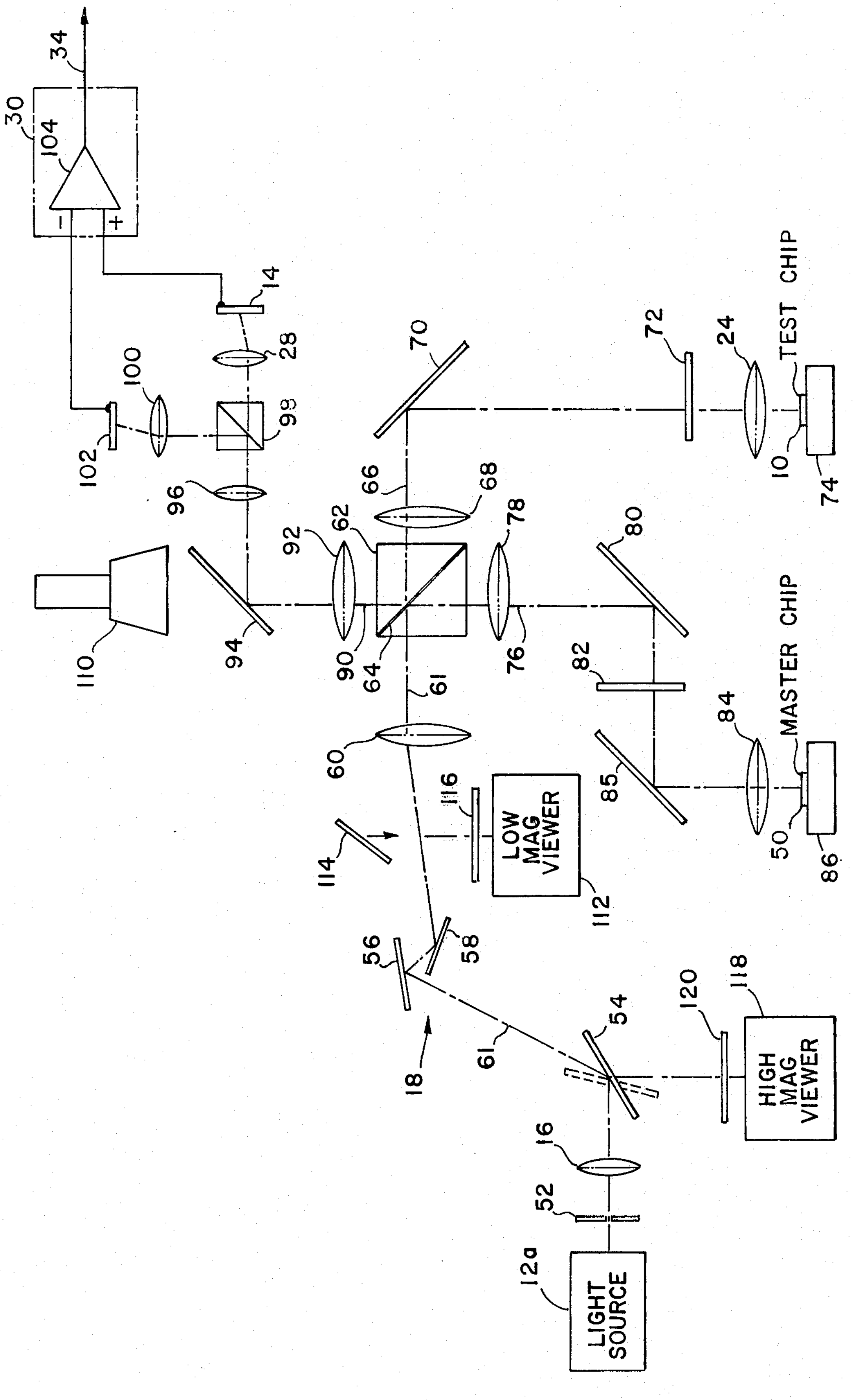
FIG. 2 is a more detailed view of the system of FIG. 1.

A number of different systems can be utilized for the test signal generator 32 which generates the signals corresponding to those that would be generated by a defect-free integrated circuit. One test signal generator can be produced by recording the signals from the photo-detector 14 when the test chip 10 is an acceptable master chip. The recorded signals are played back in synchronism with the scanning of the test chip. Another test signal generating system is provided by providing a system for simultaneously scanning a master chip. FIG. 2 illustrates a system wherein the test signal generator 32 includes apparatus for scanning a master chip 50 and detecting the light reflected from it. The apparatus of FIG. 2 includes a light source 12*a* whose light output passes through a pinhole plate 52 prior to reaching the initial lens 16. The pinhole plate 52 is utilized to produce an accurate point source of light to enable the generation of a small scanning spot at the integrated circuit chips. Light passing through the initial lens 16 is reflected by a mirror 54, which is utilized to enable visual inspection as will be described below and to deflect the beam to the mirror scanner. The light then enters a mirror scanner 18 which includes two mirrors 56, 58, one slowly pivoting back and forth to produce an X scan, and the other rapidly pivoting up and down to produce a Y scan, the two mirrors producing a complete rectangular scanning raster or other programmable scanning pattern.

Light from the mirror scanner 18 passes through a portion of a scan lens 60 which is part of a scan lens system that also includes lenses 68 and 78 and into a polarizing beamsplitter 62.

The beamsplitter 62 includes a thin film 64 which has the property of acting as a polarizer as well as a beamsplitter. The film 64 deflects vertically polarized components of incident light while transmitting horizontally polarized components. The horizontally polarized components form a component beam 66 emerging from the polarizer, which passes through a portion of the scan lens 68, is deflected by a mirror 70, passes through a quarter-wave retardation plate 72, and passes through the objective 24 to the test chip 10. The test chip 10 is held on a microscope stage support 74 that permits fine adjustment of the test chip position. The vertically polarized components of the light beam 61 that enters the polarizer beamsplitter are reflected and emerge as a vertically polarized component beam 76. This component beam 76 passes through a portion of the scan lens 78, is reflected by a mirror 80, and passes through a quarter-wave retardation plate 82. The beam 76 is then reflected by another mirror 85, and passes through the objective 84 before arriving at the master chip 50. The master chip is also held on a microscope stage support 86. The scanning beams incident on the test and master chips 10, 50 are reflected therefrom and pass back to the polarizing beamsplitter 62.

The purpose of the quarter-wave retardation plates 72, 82 is to impart a 45 degree rotation, or phase displacement, to their respective beams. Thus, for example, the vertically polarized component beam 66 undergoes a 45° rotation in passing through the plate 72 to the test chip. Also, light reflected from the test chip and passing upwardly through the plate 72 undergoes a second 45° rotation. As a result, the component beam 66 is rotated a total of 90° so that it is converted to a horizontally polarized beam when it reenters the polarizing beamsplitter 62. This vertically polarized beam is reflected by the film 64 of the polarizing beamsplitter and is directed upwardly therefrom. In a similar manner, the other quarter-wave retardation plate 82 converts the vertically polarized component beam 76 to a vertically polarized beam, after reflection from the master chip, so that the reflected component beam can pass through the beamsplitter 62. The two polarization components therefore form a recombined beam 90 that emerges from the polarization beamsplitter 62. It may be noted that the quarter-wave retardation plates 72, 82 not only permit recombination of the beams after reflection, but also result in circularly polarized light being incident on both integrated circuit chips. Scanning with circularly polarized light largely eliminates difficulties associated with preferential polarization effects.

The combined beam 90 that emerges from the beamsplitter 62 passes through a second lens 92, is reflected by a mirror 94, passes through another lens 96, and enters a second polarizing beamsplitter 98. The beamsplitter 98 is similar to the polarizing beamsplitter 62, except that it is of a smaller size. The horizontally polarized component of the emerging beam 90, which represents light reflected from the test chip 10, passes through the polarizing beamsplitter 98, and through the collecting lens 28 onto the photo-detector 14. The vertically polarized component of the emerging beam 90, which represents light reflected from the master chip 50, is reflected by the beamsplitter 98, and then passes through a lens 100 onto another photo-detector 102. The outputs of the two photo-detectors are sensed by the comparing system 30, which is shown as including a difference amplifier 104 whose output 34 represents the difference between the electrical signals generated by the two photo-detectors 14, 102.

The use of a scanner 18 to create a scanning raster, and a polarizing beamsplitter 62 to direct different polarization components in different directions, results in the need for a scanning lens 60. The lens 60 directs light from the scanner 18 into a direction parallel to the optical axis of the system. This is necessary because the thin film 64 which splits the beam according to the polarization components, is sensitive to the direction of the incident beam. The scanner 18 reflects the light beam 61 over a wide range of angles with respect to the optical axis, such as 25° from the axis, and if such a beam were directly incident on the polarizing beamsplitter then the amount of light transmitted and reflected would vary with the scan position. The lens 60, however, directs all of the light rays approximately parallel to the optical axis so that the proportion of transmitted and reflected light at the beamsplitter 62 remains substantially constant. It may be noted that light entering the polarizing beamsplitter may be slightly convergent as illustrated in FIG. 1, but the convergence angle is so small that it has a negligible effect.

The inspection system includes devices for permitting direct visual inspection of the integrated circuit chips. The system includes a floodlight 110 which can illuminate the two circuit chips 10, 50 by removing the mirror 94. The floodlight 110 will then illuminate both chips in the same manner as the scanning beam, because the polarizing beamsplitter 62 and lens 92 are bidirectional and symmetrical. A low magnification viewer 112 can be used to view the chips by moving a pellicle mirror 114 into the optical path to reflect light through the viewer. A rotatable polarizer 116 is provided in front of the viewer 112. An operator can view either chip by rotating the polarizer 116 so that it allows only light from one of the chips to reach the viewer 112. A similar high magnification viewer 118 and polarizer 120 permits viewing of either chip at a high magnification. The polarizers 116, 120 can be removed, or can be rotated to positions wherein they permit light from both test chips to be seen, to permit alignment of the chips by viewing the superimposed chips.

Figure 3:
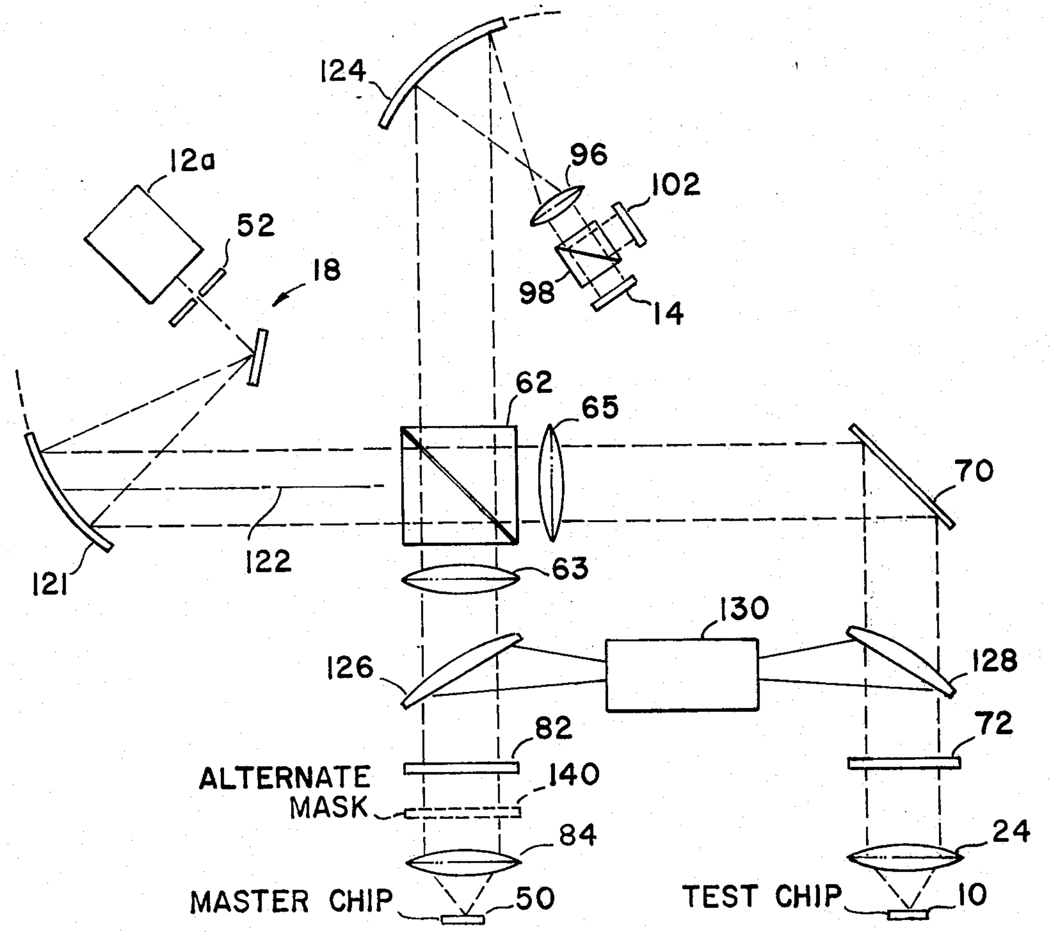
FIG. 3 is a simplified view of a visual inspection system constructed in accordance with another embodiment of the invention.

FIG. 3 illustrates another viewing system constructed in accordance with the invention, which utilizes parabolic mirrors in place of portions of the scan lenses in order to simplify the system. It may be noted that although a single lens symbol is shown for each lens such as 60 and 92, the lenses typically include numerous lens components and are generally complex and expensive. The system of FIG. 3 includes the light source 12a and pinhole 52, a scanner 18, and a parabolic reflector 121 for directing light from the scanner into paths parallel to the optical axis 122 of the system. The reflector 121 has a focal point at the scanner 18, so that all light rays originating from a scanner 18 are reflected parallel to the optical axis 122. The light enters a beamsplitter 62 where the horizontal components pass towards the test chip 10 and the vertical components are reflected towards the master chip 50. The horizontal components are reflected by a mirror 70, pass through a quarter-wave retardation plate 72 and objective 24 onto the test chip. The rays reflected at the beamsplitter pass through a quarter-wave plate 82 and an objective 84 to the master chip 50. The polarization components reflected from the test chip and master chip return to the polarization beamsplitter 62 and pass to another parabolic mirror 124. Light from the mirror 124 passes through a lens 96, through another polarizing beamsplitter 98, and is directed onto the two photo-detectors 14, 102. Direct viewing can be performed by the use of partially transmitting (but non-polarizing) beamsplitters 126, 128 that reflect light from the chips onto a viewer 130. Simultaneous viewing and scanning can be realized by scanning at light wave length $\lambda_1$, and providing an appropriate band pass filter for $\lambda_1$ at the detector assembly (ahead of beamsplitter 98). Broad band illumination may be introduced at 126 and 128 so that 130 can see a large portion of the test, or master chip and the scanning spot simultaneously.

The apparatus of FIG. 3 provides for the substitution of a mask 140 in place of the master chip 50. Any of the masks used in the diffusion or metalization steps employed in the production of the integrated circuit, or a photographic replica of such a mask, is utilized in place of the reference or master chip. The use of such a mask permits inspection of an integrated circuit chip after it is only partially completed, so that inspections may be made to permit the rejection of defective chips prior to the performance of further fabrication work on them. The use of masks also eliminates the need for a master chip which has to be painstakingly visually inspected. The mask typically has apertures corresponding to the deposited material on the test chip. A uniformly reflecting surface can be positioned behind a mask 140, or the computer which compares the outputs of the two detectors 14, 102 can be programmed to account for the fact that the signals representing light from the mask and test chip are complementary rather than the same.

Thus, the invention provides a system for the visual or optical inspection of microelectronic circuits by comparing the output of a photo-detector which senses light reflected from the test circuit with signals corresponding to light that would be reflected from a defect-free circuit of the same type. A system can include a polarizing beamsplitter for dividing a scanning beam into different polarization components that are respectively directed onto a test chip and a master or defect-free chip, so that light from the different chips can be later separated by a second polarizing beamsplitter for detection by different photo-detectors. A telecentric lens means is positioned between the scanner and polarizing beamsplitter so that the light enters the beamsplitter at a constant angle throughout the limits of the scanning raster. The scanning spot at each integrated circuit chip is produced by forming a light spot at an image plane in front of an objective lens, and by utilizing an objective lens which focuses a spot at the image plane onto the chips. The objective lens also serves to gather light reflected from the chip for detection by a photo-detector.

A preferred arrangement for a system for comparing the two reflectance beams will now be discussed. In the discussion that follows, the reflectance data obtained by scanning a portion of a line, a whole line, or a series of lines, is treated as a vector quantity. Thus, vector A is derived by scanning over some discrete portion of the sample or test chip and vector B is derived by scanning in identical fashion, and in unison, over a corresponding portion of the reference chip. Another way of stating this is that if we are going to scan a 2 × 2 region of a test chip for vector A, having values $$\begin{bmatrix} a_1 & a_2 \\ a_3 & a_4 \end{bmatrix};$$

then we will similarly scan a 2 × 2 region of the reference chip $$\begin{bmatrix} b_1 & b_2 \\ b_3 & b_4 \end{bmatrix}$$

for vector B.

The correlation coefficient between the two fields of the vectors A and B can be expressed as their normalized inner product:

$$\cos \angle_{B}^{A} = \frac{A \cdot B}{|A|\ |B|} = \text{correlation coefficient} \qquad (1)$$

This is equivalent to saying cosine of angle between $$A \ \& \ B = \frac{\Sigma a_i b_i}{\sqrt{\Sigma a_i^2}\sqrt{\Sigma b_i^2}}$$

The scalar quantity thus obtained can be interpreted as a measure of similarity between A and B, similarity being taken to mean that no significant defect or fault exists, and the extent of dissimilarity may be taken as an indication of the presence of an anomaly which may or may not be significant depending upon some threshold criteria.

This approach, however, does not provide a satisfactory solution when the differences between the vectors are very small. The surface portions represented by vectors A and B are always very similar even in the presence of faults and defects. Another drawback is that it is not readily possible, using this detection algorithm to distinguish in which vector field the detected anomaly exists. Another test, such as the ratio of A and B must be made. Its most significant disadvantage is that the detection technique is relatively insensitive to small fields such as a matrix of (1 × 2) and hence yields poor detection results when applied to integrated circuit inspection.

It is apparent that if the sensitivity to small differences could be increased, the number of data points being processed would be minimized, and computing requirements would be simplified. The probability of finding small faults would be enhanced. It might then be possible to perform the necessary arithmetic operations either in analogue or digital form using IC modules instead of by use of a high cost computer.

An improved algorithm, in accordance with this invention, which eliminates some of the shortcomings of the above effects, is a cross-correlation between the difference between the two vector fields A and B and the suspect vector field, which is the test chip. This may be stated as:

$$\frac{(A-B)\cdot A}{|(A-B)|\ |A|} = \cos \angle_{A}^{A-B} = \text{correlation coefficient} \qquad (2)$$

Sensitivity to small differences is increased, since the test comparison is made against the test chip rather than between two very similar chips, the reference and test chips.

A logical extension of the approach is to cross-correlate the difference (A-B) with test chip vector A, and also with reference chip vector B. This may be stated as:

$$\frac{(A-B)\cdot A}{|(A-B)|\ |A|} = \cos \angle_{A}^{A-B} \quad \& $$

$$\frac{(A-B)\cdot B}{|(A-B)|\ |B|} = \cos \angle_{B}^{A-B} \qquad (3)$$

Sensitivity to small differences is further increased because two tests are made, one against the test chip and the second against the reference chip. Computations can be simplified by squaring the terms.

If the difference (A—B) correlates with vector A of the test chip to a greater degree than to vector B of the reference chip and A is greater than B, then it is apparent that the anomaly is sited in the test chip and not in the reference chip. Conversely, if A is less than B then the angle between the difference vector (A—B) and vector A is again smaller than the angle between (A—B) and vector B. However, the dot product of the right hand number of equation (3) is greater than the left and a negative resultant is obtained. Thus, the sign of the arithmetic difference between the correlation coefficience is a definite indicator of the source and nature of the difference between vector fields A and B, and the magnitude of this value can be interpreted as a measure of disimilarity. It is possible to assign a threshold which indicates the significance of the anomaly. It is also possible to classify the defect. Thus, the detection algorithm may be stated as $$\left[\cos \angle_{A}^{A-B}\right]^2 - \left[\cos \angle_{B}^{A-B}\right]^2 = \Gamma_1 \qquad (4)$$

| Condition | | Fault Location | ± Output |
|---|---|---|---|
| Case 1 | A<B | B | Not required, B is reference |
| Case 2 | A>B | A | Positive |
| Case 3 | A>B | B | Not required, B is reference |
| Case 4 | A<B | A | Negative |

Figure 4:
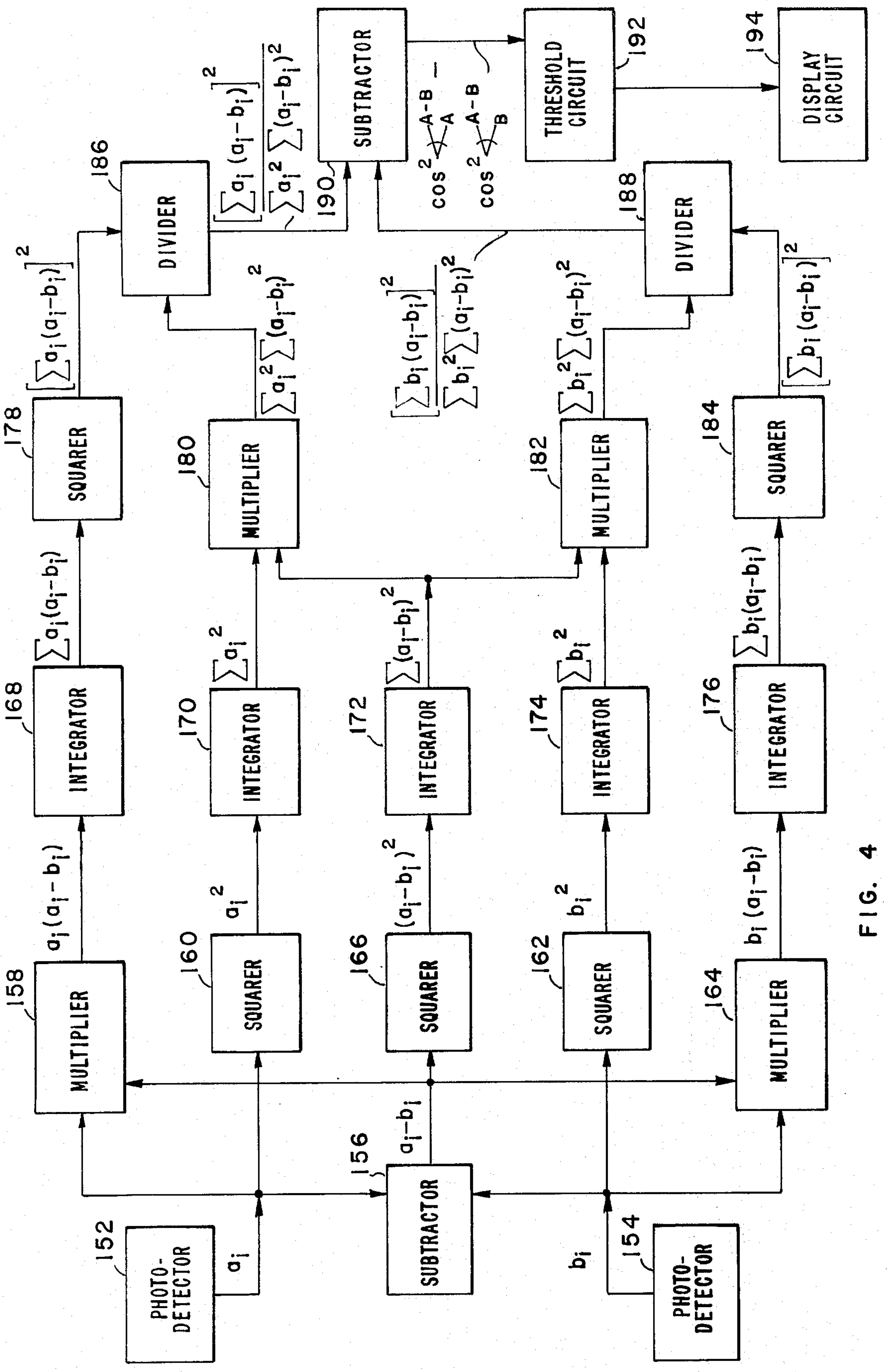
FIG. 4 is a block schematic diagram of a preferred comparing system, in accordance with this invention.

Referring now to FIG. 4, there may be seen a block diagram of a comparing system which comprises an arrangement for implementing the algorithm. This comparing system may be used to replace the differential amplifier 104, shown in FIG. 2. A photodetector 152 senses the reflectance from a test chip while a photodetector 154 senses the reflectance from the surface of a reference chip. The photodetectors convert the received signals to representative analogue signals. These analogue signals may thereafter be converted to digital signals and handled digitally, or may be maintained as analogue signals and handled in an analogue fashion. However, the arithmetic processing is the same for both.

The output of the detector 152, which is designated as $a_i$, is applied to a subtractor circuit 156, a multiplier circuit 158, and to a squarer circuit 110. The output of the photodetector 154, is similarly applied to the subtractor circuit 156, a squarer circuit 162, and a multiplier circuit 164. The output of the photodetector 154, is designated as $b_i$. $a_i$ and $b_i$ are the values obtained at each read point on the respective chip under test and reference chip. The subtractor 156, provides, as its output, the difference term, $a_i - b_i$. This is applied to the respective multiplier circuits 158 and 164 and also to a squarer circuit 166.

The multiplier circuit 158, in response to its inputs, generates an output indicated as $a_i\ (a_i - b_i)$. The output of the multiplier 164, in response to its inputs comprises the quantity $b_i\ (a_i - b_i)$. The output of the squarer circuit 160 constitutes the quantity $a_i^2$. The output of the squarer 162 constitutes the quantity $b_i^2$ and the output of the squarer circuit 166 constitutes the quantity $(a_i - b_i)^2$.

The output of the multiplier circuit 158, [$a_i(a_i - b_i)$], is applied to an integrator circuit 168. The output of the squarer circuit 160 [$a_i^2$], is applied to an integrator 170. The output of the squarer circuit 166 [$(a_i - b_i)2$], is applied to an integrator 172. The output of the squarer circuit 162, [$b_i^2$], is applied to an integrator 174. The output of the multiplier circuit 164, [$b_i[a_i - b_i)$], is applied to an integrator curcuit 176. It will be appreciated that the outputs from all of these integrators will comprise the integrals of all of their inputs.

Integrator circuit 168 output, $\Sigma a_i(a_i - b_i)$ applied to a squarer circuit 178. Integrator circuit 170 output, [$\Sigma a_i^2$] is applied to a multiplier circuit 180. Intetrator circuit 172 output, [$\Sigma(a_i - b_i)2$], is applied to the multiplier circuits 180 and 182. Integrator circuit 174 output, [$\Sigma b_i^2$], is applied to the multiplier circuit 182. Integrator circuit 176 output [$\Sigma b_i(a_i - b_i)$], is applied to a squarer circuit 184. The outputs from the square circuit 178, [$\Sigma a_i(a_i - b_i)$]2, and the multiplier circuit 180 [$\Sigma a_i^2 \Sigma (a_i - b_i)^2$] are applied to a divider circuit 186. The outputs from the multiplier circuit 182, [$\Sigma b_i^2(a_i - b_i)^2$], and the squarer circuit 184, [$\Sigma b_i(a_i - b_i)$]$^2$, are applied to a divider circuit 188. The outputs from the divider circuits 186 and 188 are applied to a subtractor circuit 190 which performs the subtraction shown in equation (4). The subtractor output is applied to a threshold circuit 192. This circuit provides an output only in the presence of a defect on the chip undergoing test. The threshold circuit output is applied to an indicator circuit 194 which, in response to the threshold output, indicates acceptability or non-acceptability. The threshold circuit can be any well known arrangement for comparing voltages such as, a pair of differential amplifiers, one of which is biased positively and will not produce an output unless its input exceeds the positive threshold, and the second amplifier is biased negatively and does not produce an output unless its input exceeds the negative threshold. Thus, a positive and/or negative acceptability range can be sensed.

The mathematical terms generated by the circuits are shown on the drawings. The circuits shown are well known in the art.

There has accordingly been shown and described herein a novel and useful system for producing a pair of light beams for scanning integrated circuit chips, detecting the light reflectance from these chips, and comparing them automatically and with a high degree of precision to determine whether or not the chip under test is acceptable.

What is claimed is:

1. In apparatus for inspecting a microelectronic circuit by directing a narrow light beam through a scanning device so that the light beam describes a predetermined scanning raster pattern at the microelectronic circuit, and detecting the reflected light, the improvement comprising means for splitting the light emerging from the scanning device into two light beam components that travel in two different directions;

first and second circuit holding means respectively positioned in the paths of the two beam components, for respectively holding a reference microelectronic circuit device and a test microelectronic circuit device to be inspected;

first and second light detectors;

means for directing light reflected from the surface of each microelectronic circuit device in response to being scanned by said light beam components, onto a different one of the light detectors, each light detector producing output signals representative of the light reflected from elemental areas of said surfaces; and comparing means connected to the two light detectors for comparing said output signals and producing an output indicative of said comparison.

2. The improvement described in claim 1 wherein said splitting means produces component beams of mutually perpendicular directions of polarization, and recombines the component beams after they have been reflected from the two microelectronic circuit devices, into an emerging beam; and said directing means includes a second polarizing beamsplitter positioned between the splitting means and the light detectors for splitting the emerging beam into two resplit beam components of mutually perpendicular directions of polarization and for directing each of the two resplit beam components onto a different one of the light detectors.

3. In apparatus as recited in claim 1 wherein said comparing means comprises means responsive to the output signals from said first and second light detectors for respectively generating a first function signal representative of the function $$\cos^2 \angle_{A}^{A-B} = \frac{[\Sigma a_i\,(a_i - b_i)]^2}{\Sigma a_i^2\, \Sigma (a_i - b_i)^2};$$

and a second function signal representative of the function $$\cos^2 \angle_{B}^{A-B} = \frac{[\Sigma b_i\,(a_i - b_i)]^2}{\Sigma b_i^2\, \Sigma (a_i - b_i)^2};$$

where $a_i$ represents the output signals successively provided by said first light detector and $b_i$ represents the output signals successively provided by said second light detector, means for subtracting the first function signal from said second function signal to produce a difference signal, and means for determining whether or not the value of said difference signal is acceptable whereby a determination is provided as to whether or not said test microelectronic circuit is acceptable.

4. In apparatus as recited in claim 3 wherein said means for generating said first function signal includes means for subtracting the output signals of said first and second light detectors to produce a first difference signal, means for multiplying the output signal of said first detector with said first difference signal to produce a first product signal, means for squaring said first difference signal to produce a first squared signal, means for squaring the output signal of said first detector to produce a second squared signal, means for integrating said first squared signal to produce a first integrated signal, means for integrating said second squared signal to produce a second integrated signal, means for integrating said first product signal to produce a third integrated signal, means for multiplying said first and second integrated signals to produce a second product signal, means for squaring said third integrated signal to produce a third squared signal, and means for dividing said third squared signal by said second product signal to produce said first function signal.

5. In apparatus as recited in claim 4 wherein said means for generating said second function signal includes means for squaring the output signal of said second light detector to provide a fourth squared signal, means for multiplying said first difference signal with the output signal of said second light detector to provide a third product signal, means for integrating said fourth squared signal to produce a fourth integrated signal, means for integrating said third product signal to produce a fifth integrated signal, means for multiplying said first integrated signal with said fourth integrated signal to produce a fourth product signal, means for squaring said fifth integrated signal to produce a fifth squared signal, and means for dividing said fourth product signal by said fifth squared signal to produce said second function signal.

6. In apparatus for inspecting a microelectric circuit by directing a narrow light beam through a scanning device so that the light beam describes a predetermined scanning raster pattern at the microelectronic circuit and detecting the reflected light, the improvement comprising means for splitting the light emerging from the scanning device into two light beam components that travel in two different directions;

a circuit holding means positioned in the path of one of said beam components for holding a test microelectronic circuit device to be inspected;

a mask having a pattern which is acceptable and substantially identical to that of a test microelectronic circuit device to be inspected;

means for holding said mask in the path of the other of said beam components, first and second light detectors;

means for directing light reflected from the surface of said test microelectronic circuit device and said mask, in response to being scanned by said light beam components, onto a different one of the light detectors, each light detector producing output signals representative of the light reflected from elemental areas of said surfaces; and comparing means connected to the two light detectors for comparing said output signals and producing an output indicative of said comparison.

7. Apparatus for inspecting a microelectronic circuit comprising light generating means for generating a first light beam a first polarizing beamsplitter means for producing second and third mutually perpendicularly polarized light beams in response to an impinging first light beam;

light directing means for directing said first light beam at said first polarizing beamsplitter means;

first and second circuit holders for respectively holding a reference microelectronic circuit and a test microelectronic circuit which is to be inspected;

means disposed between said first polarizing beamsplitter and each circuit holder for directing a different one of the polarized light beams on a corresponding microelectronic circuit and for directing the light beam back to the beamsplitter after reflection by the circuit, the beamsplitter being operative to recombine the two light beams;

a quarter wave retardation plate interposed in the path of each light beam between said first polarizing beamsplitter and said respective first and second circuit holders, a second polarizing beamsplitter positioned in the path of the recombined beam which emerges from the first beamsplitter, for splitting the recombined beam into fourth and fifth beams;

a pair of light detectors positioned to receive the fourth and fifth beams, for generating representative electrical signals; and comparing means connected to the two light detectors for comparing their outputs and producing an indication of said comparison.

8. The apparatus described in claim 7 wherein said light directing means includes scanning mirror means for deflecting the light beam from the light generating means within a range of angles, and a parabolic mirror positioned between the scanning means and the first polarizing beamsplitter for orienting light from the scanning means so it travels along a path parallel to a predetermined optical axis, said scanning mirror being positioned at the focus of the parabolic mirror.

9. Apparatus as recited in claim 7 wherein said comparing means comprises means responsive to the output signals from said first and second light detectors for respectively generating a first function signal representative of the function $$\cos^2 \angle_{A}^{A-B} = \frac{[\Sigma a_i (a_i-b_i)]^2}{\Sigma a_i^2 \, \Sigma(a_i-b_i)^2};$$

and a second function signal representative of the function $$\cos^2 \angle_{B}^{A-B} = \frac{[\Sigma b_i (a_i-b_i)]^2}{\Sigma b_i^2 \, \Sigma(a_i-b_i)^2};$$

where $a_i$ represents the output signals successively provided by said first light detector and $b_i$ represents the output signals successively provided by said second light detector, means for subtracting the first function signal from said second function signal to produce a difference signal, and means for determining whether or not the value of said difference signal is acceptable whereby a determination is provided as to whether or not said test microelectronic circuit is acceptable.

10. A system for comparing the surface of a test chip with a reference chip comprising means for generating a first and a second light beam, including means for moving said first and second light beams in a scanning pattern, and means for respectively directing said first and second light beams in said scanning pattern at said test chip and reference chip, whereby a first reflectance beam is reflected from the surface of the test chip and a second reflectance beam is reflected from the surface of said reference chip, a first and a second photo-detector, means for respectively directing said first and second reflectance beams at said first and second photodetectors which respectively produce first and second output signals responsive thereto, means responsive to said first and second output signals for respectively generating a first function signal representative of the function -Continued $$\cos^2 \angle_{A}^{A-B} = \frac{[\Sigma a_i (a_i-b_i)]^2}{\Sigma a_i^2 \, \Sigma(a_i-b_i)^2};$$

and a second function signal representative of the function $$\cos^2 \angle_{B}^{A-B} = \frac{[\Sigma b_i (a_i-b_i)]^2}{\Sigma b_i^2 \, \Sigma(a_i-b_i)^2};$$

where $a_i$ represents said first output signals and $b_i$ represents said second output signals, means for subtracting the first function signal from the second function signal to produce a difference signal, and means for determining whether the value of said difference signal is acceptable whereby said test chip is determined as acceptable.

11. In a system for comparing the surface of a test chip with a reference chip by shining two scanning light beams at their respective surfaces to respectively produce a first and second reflectance beam, an improved comparing system, comprising a first and a second photo-detector, means for respectively directing said first and second reflectance beams at said first and second photodetectors which respectively produce first and second output signals responsive thereto, means responsive to said first and second output signals for respectively generating a first function signal representative of the function $$\cos^2 \angle_{A}^{A-B} = \frac{[\Sigma a_i (a_i-b_i)]^2}{\Sigma a_i^2 \, \Sigma(a_i-b_i)^2};$$

and a second function signal representative of the function $$\cos^2 \angle_{B}^{A-B} = \frac{[\Sigma b_i (a_i-b_i)]^2}{\Sigma b_i^2 \, \Sigma(a_i-b_i)^2};$$

where $a_i$ represents said first output signals and $b_i$ represents said second output signals, means for subtracting the first function signal from the second function signal to produce a difference signal, and means for determining whether the value of said difference signal is acceptable whereby said test chip is determined as acceptable.

12. In apparatus as recited in claim 11 wherein said means for generating said first function signal includes means for subtracting the output signals of said first and second light detectors to produce a first difference signal, means for multiplying the output signal of said first detector with said first difference signal to produce a first product signal, means for squaring said first difference signal to produce a first squared signal, means for squaring the output signal of said first detector to produce a second squared signal, means for integrating said first squared signal to produce a first integrated signal, means for integrating said second squared signal to produce a second integrated signal, means for integrating said first product signal to produce a third integrated signal, means for mutiplying said first and second integrated signals to produce a second product signal, means for squaring said third integrated signal to produce a third squared signal, and means for dividing said third squared signal by said second product signal to produce said first function signal.

13. In apparatus as recited in claim 11 wherein said means for generating said second function signal includes means for squaring the output signal of said second light detector to provide a fourth squared signal, means for multiplying said first difference signal with the output signal of said second light detector to provide a third product signal, means for integrating said fourth squared signal to produce a fourth integrated signal, means for integrating said third product signal to produce a fifth integrated signal, means for multiplying said first integrated signal with said fourth integrated signal to produce a fourth product signal, means for squaring said fifth integrated signal to produce a fifth squared signal, and means for dividing said fourth product signal by said fifth squared signal to produce said second function signal.

14. In a system for comparing the surface of a test chip with a reference chip by shining two scanning light beams at their respective surfaces to respectively produce a first and second reflectance beam, an improved comparing method comprising generating a first and a second signal responsive to said first and second reflectance beams, subtracting said first and second signals to produce a first difference signal, multiplying said first signal with said first difference signal to produce a first product signal, squaring said first difference signal to produce a first squared signal, squaring said first signal to produce a second squared signal, integrating said first squared signal to produce a first integrated signal, integrating said second squared signal to produce a second integrated signal, integrating said first product signal to produce a third integrated signal, multiplying said first and second integrated signals to produce a second product signal, squaring said third integrated signal to produce a third squared signal, dividing said third squared signal by said second product signal to produce a first function signal, squaring the second signal to provide a fourth squared signal, multiplying said first difference signal with the second signal to provide a third product signal, integrating said fourth squared signal to produce a fourth integrated signal, integrating said third product signal to produce a fifth integrated signal, multiplying said first integrated signal with said fourth integrated signal to produce a fourth product signal, squaring said fifth integrated signal to produce a fifth squared signal, dividing said fourth product signal by said fifth squared signal to produce a second function signal, and subtracting said first function signal from said second function signal to produce a signal indicative as to whether said test chip compares favorably with said reference chip.

15. Apparatus as recited in claim 8 wherein there is respectively positioned a first and a second partial light transmitting, partial light reflective mirror in the path of each light beam between the respective quarter wave retardation plates and said first polarizing beamsplitter, and viewing means positioned to receive the partially reflected light from said first and second partial light transmitting, partial light reflecting mirrors to permit viewing of said reference and test microelectronic circuits while they are being scanned.

* * * * *

UNITED STATES PATENT OFFICE

CERTIFICATE OF CORRECTION

Patent No. 3,909,602 Dated September 30, 1975

Inventor(s) Ernest Z. Micka

It is certified that error appears in the above-identified patent and that said Letters Patent are hereby corrected as shown below:

Column 9, line 45, "$-b_i)2]$," should read -- $-b_i)^2]$, -- line 48, "$[b_i[a_i-b_i)]$," should read -- $[b_i(a_i-b_i)]$, -- line 55 , "$[\Sigma(a_i-b_i)2]$," should read -- $[\Sigma(a_i-b_i)^2]$, -- line 60, "square" should read -- squarer --.

line 60, $[\Sigma a_i(a_i-b_i)]2$," should read -- $[\Sigma a_i(a_i-b_i)]^2$, --.

Signed and Sealed this

*second* Day of *March 1976*

[SEAL]

*Attest:*

RUTH C. MASON
*Attesting Officer*

C. MARSHALL DANN
*Commissioner of Patents and Trademarks*